US012561005B2

(12) United States Patent
Liu et al.

(10) Patent No.: US 12,561,005 B2
(45) Date of Patent: Feb. 24, 2026

(54) DISPLAY CONTROL METHOD, APPARATUS, ELECTRONIC DEVICE, MEDIUM, AND PROGRAM PRODUCT

(71) Applicant: Beijing Zitiao Network Technology Co., Ltd., Beijing (CN)

(72) Inventors: Chin-Wei Liu, Beijing (CN); Xiaolin Rao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/210,259

(22) Filed: Jun. 15, 2023

(65) Prior Publication Data

US 2023/0409121 A1 Dec. 21, 2023

(30) Foreign Application Priority Data

Jun. 16, 2022 (CN) .......................... 202210689023.2

(51) Int. Cl.
| | |
|---|---|
| *G06F 3/01* | (2006.01) |
| *G02B 27/01* | (2006.01) |
| *G06V 20/20* | (2022.01) |
| *G06V 40/20* | (2022.01) |

(52) U.S. Cl.
CPC ......... *G06F 3/017* (2013.01); *G02B 27/0101* (2013.01); *G02B 27/017* (2013.01); *G06F 3/011* (2013.01); *G06V 20/20* (2022.01); *G06V 40/28* (2022.01); *G02B 2027/0138* (2013.01); *G02B 2027/014* (2013.01)

(58) Field of Classification Search
CPC ...... G06V 20/20; G06V 40/28; G02B 27/017; G02B 2027/0138; G02B 2027/014; G06F 3/017; G06F 3/011
See application file for complete search history.

(56) References Cited

U.S. PATENT DOCUMENTS

| | | | | |
|---|---|---|---|---|
| 9,652,897 | B2 * | 5/2017 | Osborn .................. | G06T 11/40 |
| 9,690,367 | B2 * | 6/2017 | Pedrotti ................. | G06F 3/011 |
| 10,656,720 | B1 * | 5/2020 | Holz ....................... | G06F 3/017 |
| 10,976,804 | B1 * | 4/2021 | Atlas ....................... | G06F 3/017 |
| 11,127,215 | B1 * | 9/2021 | Narvaez ................. | G09G 3/001 |
| 11,334,212 | B2 * | 5/2022 | Ravasz ................... | G06V 40/20 |
| 11,625,090 | B2 * | 4/2023 | Nienstedt .............. | G06F 3/0325 |
| | | | | 345/156 |
| 11,720,168 | B1 * | 8/2023 | Jadidian ................. | G06T 13/40 |
| | | | | 345/156 |
| 11,782,514 | B2 * | 10/2023 | Liu ....................... | G06F 3/0304 |
| | | | | 345/156 |
| 11,816,757 | B1 * | 11/2023 | Summers ................ | G06F 3/012 |
| 11,861,136 | B1 * | 1/2024 | Faulkner .............. | G06F 1/1694 |
| 12,072,505 | B2 * | 8/2024 | Doucet ................. | A63F 13/825 |

(Continued)

FOREIGN PATENT DOCUMENTS

| | | |
|---|---|---|
| CN | 112558773 A | 3/2021 |
| CN | 112947754 A | 6/2021 |

*Primary Examiner* — Tadesse Hailu

(57) ABSTRACT

This disclosure relates to display control method, apparatus, electronic device, medium, and program product. The method includes: receiving a first gesture input; and displaying prompt information in response to the first gesture input, the prompt information being determined according to a position of a peripheral associated with the head-mounted display device.

13 Claims, 4 Drawing Sheets

(56)          References Cited

U.S. PATENT DOCUMENTS

| | | | | |
|---|---|---|---|---|
| 2015/0261318 | A1* | 9/2015 | Scavezze | G06F 3/017 |
| | | | | 345/158 |
| 2015/0352437 | A1* | 12/2015 | Koseki | A63F 13/5255 |
| | | | | 463/31 |
| 2017/0318019 | A1* | 11/2017 | Gordon | G06V 40/67 |
| 2017/0357332 | A1* | 12/2017 | Balan | G06F 3/017 |
| 2018/0095635 | A1* | 4/2018 | Valdivia | G02B 27/0093 |
| 2018/0173323 | A1* | 6/2018 | Harvey | G06F 3/011 |
| 2019/0302903 | A1* | 10/2019 | Atlas | G06F 3/0354 |
| 2020/0074743 | A1* | 3/2020 | Zheng | G01P 13/00 |
| 2020/0226814 | A1* | 7/2020 | Tang | G06F 3/0304 |
| 2021/0011556 | A1* | 1/2021 | Atlas | G06F 3/011 |
| 2021/0090315 | A1* | 3/2021 | Gladkov | G06F 9/45512 |
| 2021/0096726 | A1* | 4/2021 | Faulkner | G06F 3/04842 |
| 2021/0134065 | A1* | 5/2021 | Ramani | G06F 3/0346 |
| 2021/0201580 | A1* | 7/2021 | Sztuk | G06T 19/006 |
| 2021/0333864 | A1* | 10/2021 | Harvey | G06T 19/006 |
| 2021/0378757 | A1* | 12/2021 | Bay | G02B 27/017 |
| 2021/0382559 | A1* | 12/2021 | Segev | G06V 10/806 |
| 2022/0091722 | A1* | 3/2022 | Faulkner | G06F 3/04815 |
| 2022/0101613 | A1* | 3/2022 | Rockel | G06F 3/0304 |
| 2022/0214743 | A1* | 7/2022 | Dascola | G06F 3/017 |
| 2022/0365589 | A1 | 11/2022 | Wu | |
| 2022/0375511 | A1* | 11/2022 | Morris | H03K 17/165 |

* cited by examiner

Display prompt information under a condition that an input position corresponding to the first gesture input is matched with a position of the control Display a control Receive a first gesture input (a)

Target position

Display the virtual model at the target position

Target object (virtual model corresponding to the peripheral)

(b)

Peripheral (c)

(a)

(b)

(c)

DISPLAY CONTROL METHOD, APPARATUS, ELECTRONIC DEVICE, MEDIUM, AND PROGRAM PRODUCT

CROSS-REFERENCE TO RELATED APPLICATIONS

The present application is based on and claims priority to Chinese Patent Application No. 202210689023.2 filed on Jun. 16, 2022, the disclosure of which is incorporated by reference herein in its entirety.

TECHNICAL FIELD

The present disclosure relates to the technical field of head-mounted display device, and in particular, to a display control method and apparatus, an electronic device, a storage medium, and a program product.

BACKGROUND

At present, mainstream Virtual Reality (VR), Mixed Reality (MR) or Augmented Reality head-mounted display devices can support a peripheral tracking interaction mode and a gesture recognition interaction mode, but when a user needs to switch from the gesture recognition interaction mode to the peripheral tracking interaction mode, sometimes he/she cannot accurately determine the position of the peripheral and thus cannot acquire the peripheral quickly, such that the user cannot switch from the gesture recognition interaction mode to the peripheral tracking interaction mode quickly.

SUMMARY

In order to solve the above technical problem, or at least partially solve the above technical problem, the present disclosure provides a display control method, apparatus, electronic device, storage medium, and program product.

In a first aspect of embodiments of the disclosure, a display control method is provided, which is applied to a head-mounted display device, the method comprising: receiving a first gesture input; displaying prompt information in response to the first gesture input, the prompt information being determined according to a position of a peripheral associated with the head-mounted display device.

Optionally, the prompt information is a target object, the target object being used for instructing the peripheral; displaying the prompt information in response to the first gesture input comprises: displaying the target object at a target position in response to the first gesture input, wherein the target position is a position corresponding to the peripheral.

Optionally, displaying the target object at the target position comprises: displaying the target object at the target position based on a see-through function of the head-mounted display device.

Optionally, the target object is a virtual model corresponding to the peripheral; displaying the target object at the target position comprises: displaying the virtual model at the target position.

Optionally, the virtual model is preset or generated from a real pose of the peripheral.

Optionally, before receiving the first gesture input, the method further comprises: displaying a control; wherein the first gesture input is a gesture input to the control.

Optionally, displaying the control comprises: displaying the control at a preset position of a virtual hand model.

Optionally, displaying the control comprises: receiving a second gesture input; and displaying the control in response to the second gesture input.

Optionally, displaying the prompt information in response to the first gesture input comprises: in response to the first gesture input, displaying the prompt information under the condition that an input position corresponding to the first gesture input is matched with a position of the control.

Optionally, after displaying the prompt information, the method further comprises: starting a peripheral tracking interaction mode under the condition that a sensor of the peripheral detects that the peripheral is held or a gesture input to the control is detected.

Optionally, the method further comprises: starting a gesture recognition interaction mode under the condition that it is detected the peripheral is not being held and a hand image is acquired by a camera of the head-mounted display device.

In a second aspect of the embodiments of the disclosure, a display control apparatus is provided, the apparatus comprising: a receiving module and a display module; the receiving module is used for receiving a first gesture input; the display module is used for displaying prompt information in response to the first gesture input received by the receiving module, the prompt information being determined according to a position of a peripheral associated with a head-mounted display device.

Optionally, the prompt information is a target object that is used for indicating the peripheral; the display module is specifically configured to display the target object at a target position in response to the first gesture input.

Optionally, the display module is specifically configured to display the target object at a target position based on a see-through function of the head-mounted display device, wherein the target position is a position corresponding to the peripheral.

Optionally, the target object is a virtual model corresponding to the peripheral; the display module is specifically configured to display the virtual model at a target position.

Optionally, the virtual model is preset or generated according to a real pose of the peripheral.

Optionally, the display module is further configured to display a control before receiving the first gesture input; and the first gesture input is a gesture input to the control.

Optionally, the display module is specifically configured to display the control at a preset position of a virtual hand model.

Optionally, the display module is specifically configured to receive a second gesture input; and display the control in response to the second gesture input.

Optionally, the display module is specifically configured to, in response to the first gesture input, display the prompt information under the condition that an input position corresponding to the first gesture input is matched with a position of the control.

Optionally, the apparatus further comprises a starting module; the starting module is configured to start a peripheral tracking interaction mode under the condition that a sensor of the peripheral detects that the peripheral is held or a gesture input to the control is detected after the prompt information is displayed.

Optionally, the apparatus further comprises a starting module; the starting module is configured to start a gesture recognition interaction mode under the condition that it is detected the peripheral is not being held and a hand image is acquired by a camera of the head-mounted display device.

In a third aspect of the embodiments of the disclosure, an electronic device is provided, the electronic device comprising a processor, a memory, and a computer program stored in the memory and executable on the processor, the computer program, when executed by the processor, performs the display control method according to the first aspect.

In a fourth aspect of the embodiments of the disclosure, a non-transitory computer-readable storage medium having a computer program stored thereon is provided, the computer program, when executed by a processor, performing the display control method according to the first aspect.

In a fifth aspect of the embodiments of the disclosure, a computer program product is provided, wherein the computer program product comprises a computer program, the computer program, when runs on a processor, causes the processor to execute the computer program to perform the display control method according to the first aspect.

In a sixth aspect of the embodiments of the disclosure, a chip is provided, wherein the chip comprises a processor and a communication interface, wherein the communication interface is coupled to the processor, and the processor is configured to execute program instructions to perform the display control method according to the first aspect.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the disclosure.

In order to more clearly illustrate technical solutions in the embodiments of the present disclosure or in the related art, the drawings required in the description of embodiments or the related art will be briefly described below, and it is obvious for those skilled in the art that other drawings can be obtained according to these drawings without making inventive effort.

DETAILED DESCRIPTION

In order to more clearly understand the objects, features and advantages of the present disclosure, the solution of the present disclosure will be further described below. It should be noted that, in the case of no conflict, the embodiments and features in the embodiments of the present disclosure may be combined with each other.

In the following description, numerous specific details are set forth in order to provide a thorough understanding of the present disclosure, but the present disclosure may be implemented in other ways than those described herein; it is obviously that the embodiments disclosed in the specification are only a few instead of all embodiments of the present disclosure.

The terms "first," "second," and the like in the specification and in the claims of the present disclosure are used for distinguishing similar elements and not necessarily for describing a particular sequential or chronological order. It shall be appreciated that the data so used may be interchanged in appropriate situations such that embodiments of the disclosure may be implemented in an order other than those illustrated or described herein, and that objected distinguished by the words "first," "second," etc. are usually of one type, and the number of the objects is not limited, e.g., the first object may be one, or may be multiple. In addition, "and/or" in the specification and claims means at least one of the connected objects, and the character "/" generally means that the former and latter related objects are in an "or" relationship.

Compared with the related art, the technical solution provided by the embodiments of the disclosure has the following advantages: in an embodiment of the disclosure, a first gesture input is received; in response to the first gesture input, prompt information is displayed, the prompt information being determined according to a position of a peripheral associated with the head-mounted display device, so that when a user is in a gesture recognition interaction mode in a virtual reality, mixed reality or augmented reality scene, displaying of the prompt information can be triggered by the first gesture input, and then the position of the peripheral is rapidly determined according to the prompt information, and the peripheral is rapidly acquired, and thus, the gesture recognition interaction mode can be rapidly switched to a peripheral tracking interaction mode, thereby increasing the switching efficiency of a switch from the gesture recognition interaction mode to the peripheral tracking interaction mode.

Figure 1:
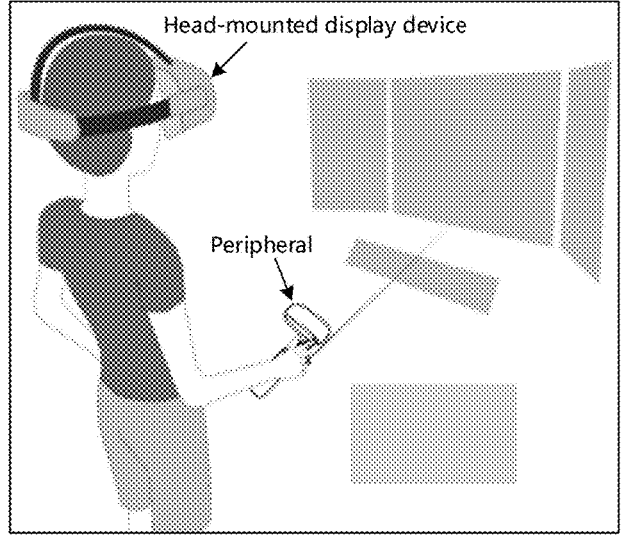
FIG. 1 is a schematic diagram of an interaction scene of a head-mounted display device provided in an embodiment of the disclosure.
Figure 1:
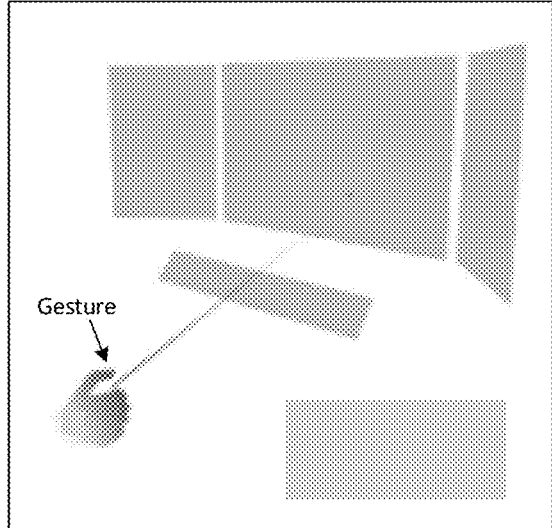

First, FIG. 1 is a schematic diagram of an interaction scene of a head-mounted display device illustrated in an embodiment of the present disclosure, wherein the head-mounted display device in the embodiment of the present disclosure supports a peripheral tracking interaction mode and a gesture recognition interaction mode.

The head-mounted display device in the embodiment of the present disclosure may be a head-mounted display device having a VR function, an MR function, or an AR function, such as a VR head display, VR glasses, a VR helmet, an MR head display, MR glasses, an MR helmet, an AR head display, AR glasses, or an AR helmet, and the like, which may be specifically determined according to practical conditions that would not be defined in the embodiment of the disclosure.

An execution body of the display control method provided in the embodiment of the present disclosure may be the above-mentioned head-mounted display device, or may also be a functional module and/or a functional entity capable of performing the display control method in the head-mounted display device, which may be specifically determined according to practical use requirements that would not be defined in the embodiment of the disclosure The display control method provided in the embodiment of the present disclosure is described in detail below with reference to the accompanying drawings by specific embodiments and application scenarios thereof.

Figure 2:
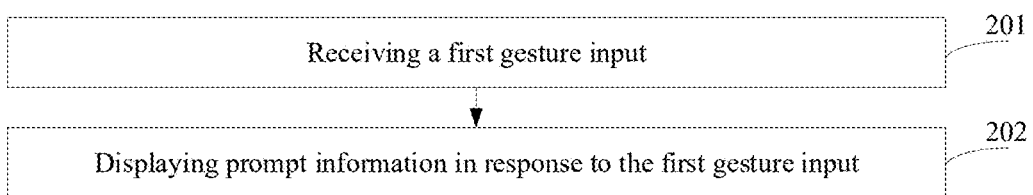
FIG. 2 is a schematic flowchart of a display control method provided in an embodiment of the disclosure.

As shown in FIG. 2, an embodiment of the present disclosure provides a display control method applied to a head-mounted display device, and the method may include steps 201 to 202 described below.

201. A first gesture input is received.

Optionally, the first gesture input may be any input for triggering display of prompt information, which may be determined according to practical conditions and is not limited herein.

Optionally, the gesture input may be a static gesture input, such as an OK gesture, a scissors gesture, a hands cross gesture, a hands together gesture or the like; or a dynamic gesture input, such as a hand waving action, a one-finger stroke action, a hand clapping action, a head shaking action, a nodding action, a hands together action or the like; this may be determined according to practical conditions, and is not limited herein.

It will be appreciated that in the embodiment of the present disclosure, the gesture input may be detected through gesture recognition technologies, and no matter the gesture is static or dynamic, the recognition sequence of the gesture is as follows: firstly acquiring an image, detecting and segmenting a hand, analyzing a gesture, and then performing static or dynamic gesture recognition.

202. In response to the first gesture input, prompt information is displayed.

Wherein the prompt information is determined according to a position of a peripheral associated with the head-mounted display device.

In an embodiment of the present disclosure, the peripheral may be a controller of the head-mounted display device, may be a handle (which may be an optical handle) of the head-mounted display device, and may also be other associated peripherals of the head-mounted display device, which may be specifically determined according to practical conditions and is not limited here.

Optionally, the prompt information may be position information of the peripheral, and specifically, the position of the peripheral may be indicated by text, an image, or a model, etc. If the prompt information is text, the position of the peripheral may specifically be a position of the peripheral relative to the user, or a position of the user in a (virtual reality, augmented reality or mixed reality) space; if the prompt information is an image or a model, the position of the image or the model is the position of the peripheral.

Optionally, the prompt information may also be information on how to move in order to be capable of acquiring the peripheral, which may be specifically determined according to practical conditions and is not limited here.

It will be appreciated that in response to the first gesture input, the position of the peripheral is firstly determined by a positioning tracking technique and then the prompt information is determined according to the position of the peripheral.

In the embodiment of the disclosure, when in the gesture recognition interaction mode in a virtual reality, mixed reality or augmented reality scene, displaying of the prompt information can be triggered through the first gesture input, and then the position of the peripheral can be quickly determined according to the prompt information, such that the peripheral can be quickly acquired. Hence, the gesture recognition interaction mode can be quickly switched to a peripheral tracking interaction mode, and the switching efficiency of a switch from the gesture recognition interaction mode to the peripheral tracking interaction mode is increased.

Optionally, the prompt information is a target object that is used for indicating the peripheral; the above-described step 202 can be specifically performed by the following step 202*a*.

202*a*. In response to the first gesture input, a target object is displayed at a target position.

Optionally, the target object may be an image of the peripheral, or a virtual model of the peripheral, or may be another object, which may be determined according to practical conditions and is not limited herein.

Wherein the target position is a position corresponding to the peripheral. It will be appreciated that the target position is matched with a position of the peripheral, and specifically, the target position is the position of the peripheral, or the target position belongs to the position of the peripheral, or a distance between the target position and the position of the peripheral is less than or equal to a distance threshold, which may be specifically determined according to practical conditions and is not limited here.

Wherein the distance threshold may be determined according to practical conditions and is not limited herein.

In an embodiment of the disclosure, the prompt information is the target object, and the position of the peripheral can be indicated more accurately and more vividly by displaying the target object at the target position, and thus a user can be easy to quickly acquire the peripheral.

Optionally, the above-described step 202*a* may be specifically performed by the following step 202*b*.

202*b*. Based on a see-through function of the head-mounted display device, the target object is displayed at the target position.

Optionally, in an embodiment of the disclosure, the see-through function may be implemented by a See-Through technology or a pass through technology in a VR, MR, or AR scene, which may be specifically determined according to practical conditions and is not limited herein.

The see-through function implemented by the See-Through technology in a VR scene is introduced below.

It is appreciated that the VR provides an interactive virtual three-dimensional space in which a simulation of the senses of sight, hearing, touching, etc. is provided through the sensing unit to a user to allow people to enter a fully immersed virtual world. Therefore, the VR requires the user to use a specific head display to form a completely enclosed virtual space.

The See-Through breaks this limitation, so that the user can go out of the VR world. According to the See-Through, real-time views of the surrounding environment are collected by a camera and displayed on a screen, such that people may have a feeling of being able to see the surrounding real world directly through the head display with eyes, so this is also called a see-through function. In the VR, the See-Through function can enable a user to interact with the external real world by actions without removing the head-mounted display device, such as touching and opening a controller, even signing for express delivery, receiving and sending short messages and the like, and thus, sustainability of VR head display experience is enhanced.

The implementation principle of the See-Through function is as follows: there are mainly two common approaches for implementation of the See-Through function, namely: Optical See-Through (OST) and Video See-Through (VST).

Wherein, in the OST, the real world is seen through a translucent optical synthesizer placed in front of the eyes of a user. The optical synthesizer is also used to reflect computer-generated images into the eyes of user, thereby combining the real world with the virtual world. The OST is advantageous in that it is less prone to the risk of cyber-sickness while still having very a high resolution close to the real world.

Wherein, in the VST, real-time views of the real world are captured by a camera, and then combined with computer image technology and presented on an opaque display. Using the VST, the algorithm can fully control the visual integration, allowing for full occlusion between virtual and real objects, and even higher levels of modification to the real object.

In the embodiment of the disclosure, displaying of the peripheral can be realized through the see-through function, so that a user can be easy to quickly acquire the peripheral, thereby enhancing the user experience.

Optionally, the target object is a virtual model corresponding to the peripheral; the above-described step 202*a* can be specifically performed by the following step 202*c*.

202*c*. A virtual model is displayed at the target position.
   Optionally, the virtual model is preset or generated according to a real pose of the peripheral.

It is appreciated that in a virtual reality, mixed reality or augmented reality scene, the virtual model corresponding to the peripheral is displayed, and a position of the virtual model is a position of the peripheral. If the virtual model is preset, the pose of the virtual model is the same as or different from the real pose of the peripheral; if the virtual model is generated according to the current real pose of the peripheral, the pose and form of the virtual model may be the same as the real pose of the peripheral, so that the user can grab the peripheral by grabbing the virtual model in the virtual reality, mixed reality or augmented reality scene.

In the embodiment of the disclosure, the virtual model corresponding to the peripheral is displayed without destroying the virtual reality, mixed reality or augmented reality scene, such that the user can quickly acquire the peripheral, and thus, the user experience can be enhanced.

Optionally, the first gesture input is a gesture input to a control. Before the step 201, the display control method provided in the embodiment of the present disclosure may further comprise the following step 203, and the above-described step 201 may specifically include the following step 201*a*.

203. A control is displayed.

Wherein the icon of the control may be a peripheral icon or other icons, and the icon of the control may be determined according to practical use requirements, which is not limited here.

Optionally, if the head-mounted display device is a VR device, the control is displayed in a virtual reality space; if the head-mounted display equipment is an MR device, the control is displayed in a mixed reality space; if the head-mounted display device is an AR device, the control is displayed in an augmented reality space; this can be specifically determined according to practical conditions and is not limited herein.

201*a*. The first gesture input to the control is received.

Wherein the first gesture input may be a click input to the control, a slide input to the control, or other feasibility inputs to the control, which is not limited herein.

Optionally, the click input described above may be a single click input, a double click input, a single-finger click input, a double-finger click input, a multi-finger click input, an extended-press input, a short-press input, or the like; the slide input described above may be a slide input in any direction, and may be a single-finger slide input, a two-finger slide input, a multi-finger slide input, or the like.

In the embodiment of the disclosure, the control is displayed in a virtual reality, mixed reality or augmented reality scene, and the control is used for prompting a user that a click on the control may trigger displaying of the prompt information. Thus, when the user needs to switch from a gesture recognition mode to a peripheral tracking recognition mode and cannot find a peripheral, the user can click the control to enable the head-mounted display device to display the prompt information in response to the received gesture input of the click on the control, such that the user can quickly determine the position of the peripheral according to the prompt information.

In the embodiment of the disclosure, through the control, on the one hand, the user can be prompted, and on the other hand, inaccurate first gesture input resulting in failure to trigger the head-mounted display device to display the peripheral can be avoided, thereby ensuring accuracy of the first gesture input.

Optionally, the control may be displayed at any position in a virtual reality space or a mixed reality space, or may be displayed on a virtual hand model. This may be determined specifically according to practical conditions and is not limited here.

Optionally, the above-described step 203 may be specifically performed by the following step 203*a*.

203*a*. The control is displayed at a preset position of a virtual hand model.

Wherein the preset position may be a certain position on the surface of the virtual hand model, or a certain position above the virtual hand model (at a certain distance from the virtual hand model). This may be specifically determined according to practical conditions and is not limited herein.

Wherein the control may be displayed at a hand back position of the virtual hand model, a wrist position of the virtual hand model, or other positions of the virtual hand model. This may be specifically determined according to practical use requirements and is not limited here.

In the embodiment of the disclosure, the control is displayed at a preset position of the virtual hand model, so that the user can conveniently implement the first gesture input, such that the operation efficiency is improved, and the user experience is enhanced.

Optionally, the control may be displayed all the time when the head-mounted display device is in the gesture recognition interaction mode, or may be triggered to display through a second gesture input, which may be specifically determined according to practical conditions and is not limited here. Triggering the displaying through the second gesture input specifically means that the control is not displayed under the condition that the head-mounted display device has not received the second gesture input implemented by the user, and the control is displayed under the condition that the head-mounted display device has received the second gesture input implemented by the user.

Optionally, the above-described step 203 may be specifically performed by the following steps 203*b* to 203*c*.

203*b*. A second gesture input is received.

203*c*. In response to the second gesture input, the control is displayed.

Optionally, the second gesture input may be any input for triggering display of the control. This may be determined according to practical conditions and is not limited here.

Optionally, the second gesture input may be a static gesture input or a dynamic gesture input, which may be determined according to practical conditions and is not limited here.

The specific description on the second gesture input can refer to the above relevant description on the first gesture input, and details will not be repeated here.

In the embodiment of the disclosure, displaying of the control is triggered through the second gesture input, so that false triggering due to continuous displaying of the control can be avoided, and thus, the user experience can be improved.

Optionally, the above-described step 202 may be specifically performed by the following step 202*c*.

202*c*. In response to the first gesture input, prompt information is displayed under the condition that an input position corresponding to the first gesture input is matched with a position of the control.

It is appreciated that the input position corresponding to the first gesture input is matched with the position of the control may include that the input position corresponding to the first gesture input coincides with the position of the control, or that an X-ray corresponding to the first gesture input passes through the position of the control, and may also include other situations, which may be determined specifically according to practical conditions and are not limited herein.

It is appreciated that in the case that the input position corresponding to the first gesture input does not match the position of the control, the prompt information is prohibited from being displayed.

In the embodiment of the disclosure, by setting that the prompt information is displayed under the condition that the input position corresponding to the first gesture input is matched with the position of the control, false triggering can be avoided, the control precision of the display of the peripheral can be improved, and the user experience can be enhanced.

Optionally, after the above-described step 202, the display control method provided in the embodiment of the present disclosure may further comprise the following step 204.

204. A peripheral tracking interaction mode is started under the condition that a sensor of the peripheral detects that the peripheral is held or a gesture input to the control is detected.

In the embodiment of the disclosure, the peripheral tracking interaction mode can be started quickly according to the fact that the sensor of the peripheral detects that the peripheral is held or the gesture input to the control is detected.

Optionally, in a case that the sensor of the peripheral detects that the peripheral is held or the gesture input to the control is detected, the gesture recognition interaction mode is stopped, and the peripheral tracking interaction mode is started.

It is appreciated that, in the case that the sensor of the peripheral detects that the peripheral is held or the gesture input to the control is detected, the interaction mode is switched from the gesture recognition interaction mode to the peripheral tracking interaction mode.

It is appreciated that after the prompt information is displayed, if the user picks up the peripheral according to the prompt information, the interaction mode is switched from the gesture recognition interaction mode to the peripheral tracking interaction mode.

It is appreciated that after the prompt information is displayed, if the user clicks the control again, the interaction mode is switched from the gesture recognition interaction mode to the peripheral tracking interaction mode (at this time, the user may or may not hold the peripheral).

In the embodiment of the present disclosure, multiple trigger modes for starting the peripheral tracking interaction mode are provided, and other modes for starting the peripheral tracking interaction mode may also be provided, which may be specifically determined according to practical conditions and are not limited herein.

Figure 3:
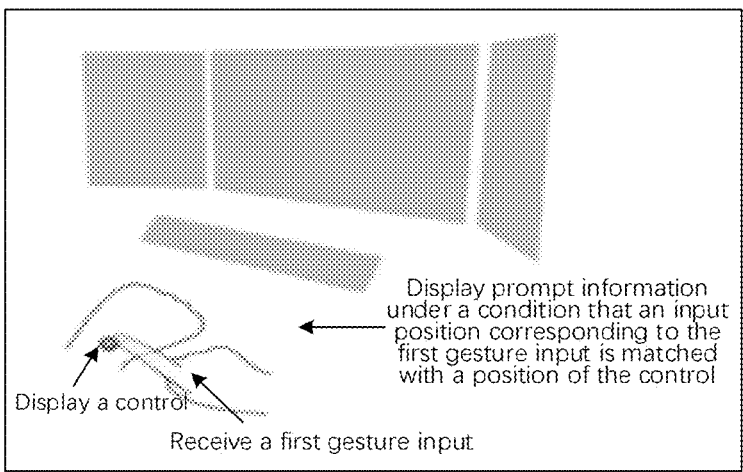
FIG. 3 is a schematic diagram of a process of switching from a gesture recognition interaction mode to a peripheral tracking interaction mode provided in an embodiment of the disclosure.
Figure 3:
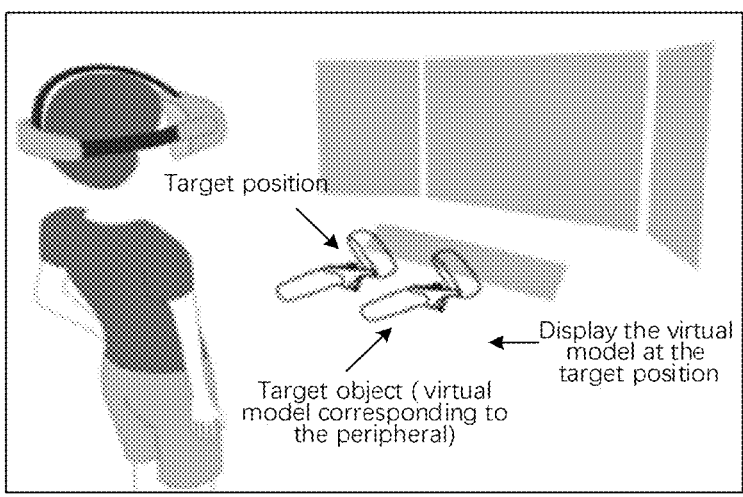
Figure 3:
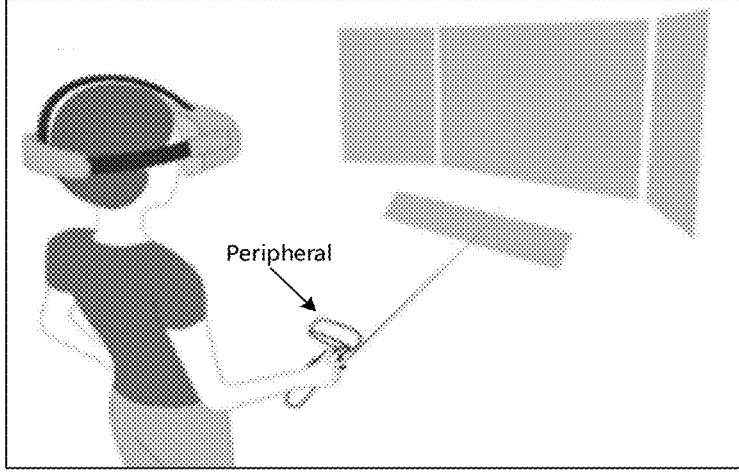

Illustratively, as shown in FIG. 3, (a) to (c) in FIG. 3 illustrate a switching process of a switch of the interaction mode from the gesture recognition interaction mode to the peripheral tracking interaction mode. (a) in FIG. 3 depicts that when the interaction mode is the gesture recognition interaction mode, a control on a hand model is clicked, (b) in FIG. 3 depicts that in response to a gesture input of clicking the control, positioning tracking of the peripheral is started to track the position of the peripheral and the peripheral is displayed, and (c) in FIG. 3 depicts that a user picks up the peripheral to switch the interaction mode to the peripheral tracking interaction mode.

Optionally, after the above-described step 202, the display control method provided in the embodiment of the present disclosure may further comprise the following step 205.

205. When it is detected that the peripheral is not being held, and a hand image is acquired by a camera of the head-mounted display device, the gesture recognition interaction mode is started.

In the embodiment of the disclosure, when it is detected that the peripheral is not being held and a hand image is acquired by a camera of the head-mounted display device, the peripheral tracking interaction mode can be started quickly.

Optionally, when the head-mounted display device is in the peripheral tracking interaction mode, if it is detected that the peripheral is in a standing state, and a hand image is acquired through a camera of the head-mounted display device, the peripheral tracking interaction mode is stopped, and the gesture recognition interaction mode is started.

It is appreciated that when the head-mounted display device is in the peripheral tracking interaction mode, if the peripheral is detected to be in a standing state or in a state of not being held, and a hand image is acquired through a camera of the head-mounted display device, the interaction mode is switched from the peripheral tracking interaction mode to the gesture recognition interaction mode.

Optionally, whether the peripheral is in a standing state may be identified through six-degree-of-freedom (6Dof) information; for example, if it is detected that the 6Dof information does not change within a preset time period, it is determined that the peripheral is in the standing state.

Wherein the 6Dof information includes position data and pose data of the peripheral.

Optionally, whether the peripheral is in the standing state may also be detected by an Inertial Measurement Unit (IMU) in the peripheral. The IMU is a device for measuring a three-axis pose angle and acceleration of an object. Typically, the IMU includes a three-axis gyroscope and a three-axis accelerometer, and some 9-axis IMUs also include three-axis magnetometers.

In the embodiment of the disclosure, a simple startup of the gesture recognition interaction mode is provided, so that the efficiency of starting the gesture recognition interaction mode can be improved, and the user experience can be enhanced.

Figure 4:
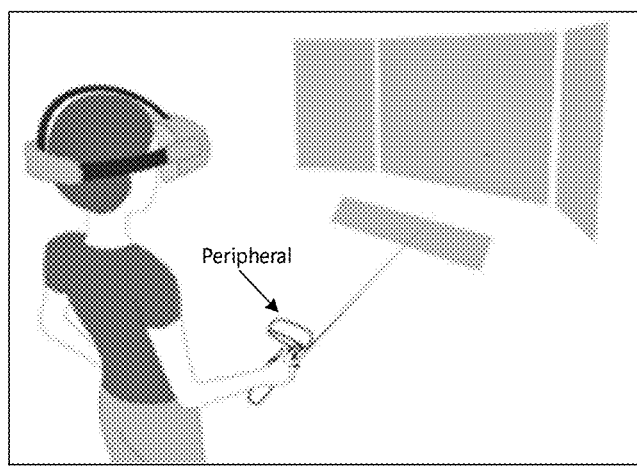
FIG. 4 is a schematic diagram of a process of switching from a peripheral tracking interaction mode to a gesture recognition interaction mode provided in an embodiment of the disclosure.
Figure 4:
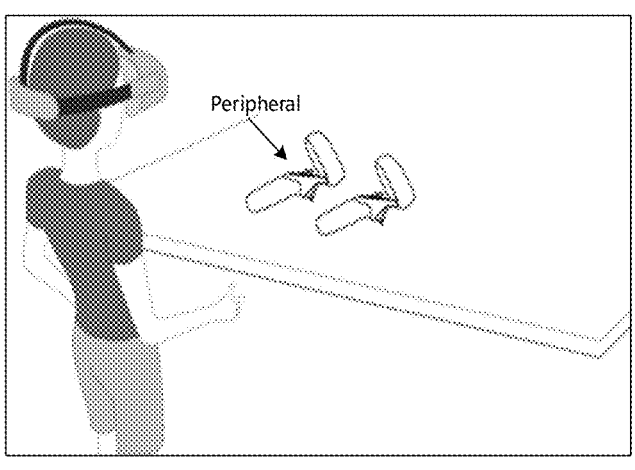
Figure 4:
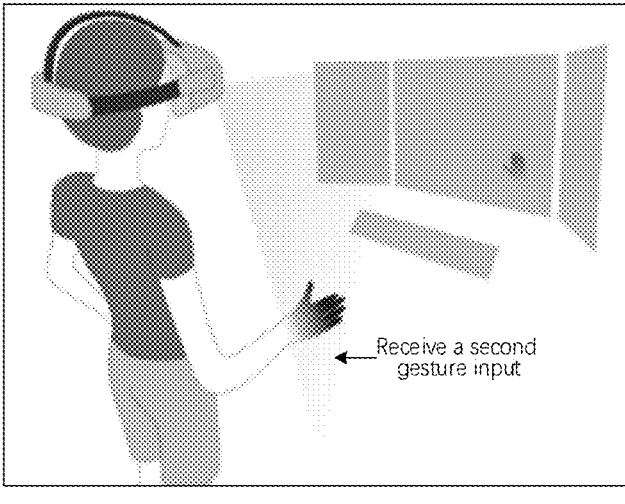

Illustratively, as shown in FIG. 4, (a) to (c) in FIG. 4 illustrate a switching process of a switch of the interaction mode from the peripheral tracking interaction mode to the gesture recognition interaction mode, wherein (a) in FIG. 4 depicts that the interaction mode is the peripheral tracking interaction mode, (b) in FIG. 4 depicts that the user puts down the peripheral and a timing is started, and (c) in FIG.

4 depicts that after the user putting down the peripheral (not holding the peripheral) for a certain time, a hand image of the user is detected, and the interaction mode is switched to the gesture recognition interaction mode.

Figure 5:
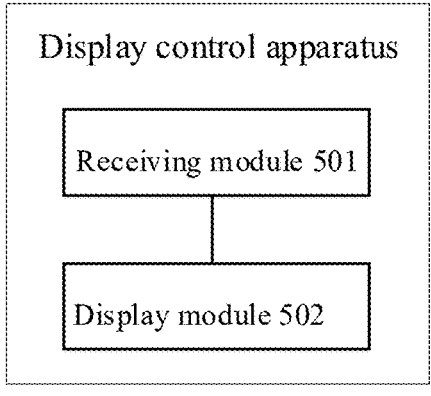
FIG. 5 is a schematic structural diagram of a display control apparatus provided in an embodiment of the disclosure.

FIG. 5 is a schematic structural diagram of a display control apparatus illustrated in an embodiment of the present disclosure. As shown in FIG. 5, the display control apparatus comprises: a receiving module 501 and a display module 502; the receiving module 501 is configured to receive a first gesture input; the display module 502 is configured to display prompt information in response to the first gesture input received 501 by the receiving module, the prompt information being determined according to a position of a peripheral associated with a head-mounted display device.

Optionally, the prompt information is a target object that is used for indicating the peripheral; the display module 502 is specifically configured to display the target object at a target position in response to the first gesture input, wherein the target position is a position corresponding to the peripheral.

Optionally, the display module 502 is specifically configured to display the target object at the target position based on a see-through function of the head-mounted display device.

Optionally, the target object is a virtual model corresponding to the peripheral; the display module 502 is specifically configured to display the virtual model at the target position.

Optionally, the virtual model is preset or generated according to a real pose of the peripheral.

Optionally, the display module 502 is further configured to display a control before receiving the first gesture input; the first gesture input is a gesture input to the control.

Optionally, the display module 502 is specifically configured to display the control at a preset position of a virtual hand model.

Optionally, the display module 502 is specifically configured to receive a second gesture input; and display the control in response to the second gesture input.

Optionally, the display module 502 is specifically configured to, in response to the first gesture input, display the prompt information under the condition that an input position corresponding to the first gesture input is matched with a position of the control.

Optionally, the apparatus further comprises a starting module; the starting module is configured to start a peripheral tracking interaction mode under the condition that a sensor of the peripheral detects that the peripheral is held or a gesture input to the control is detected after the prompt information is displayed.

Optionally, the apparatus further comprises a starting module; the starting module is configured to start a gesture recognition interaction mode under the condition that it is detected that the peripheral is not being held and a hand image is acquired through a camera of the head-mounted display device.

In the embodiment of the present disclosure, each module may implement the display control method provided in the above method embodiment, and may achieve the same technical effect, and in order to avoid repetition, details will no longer be repeated here.

Figure 6:
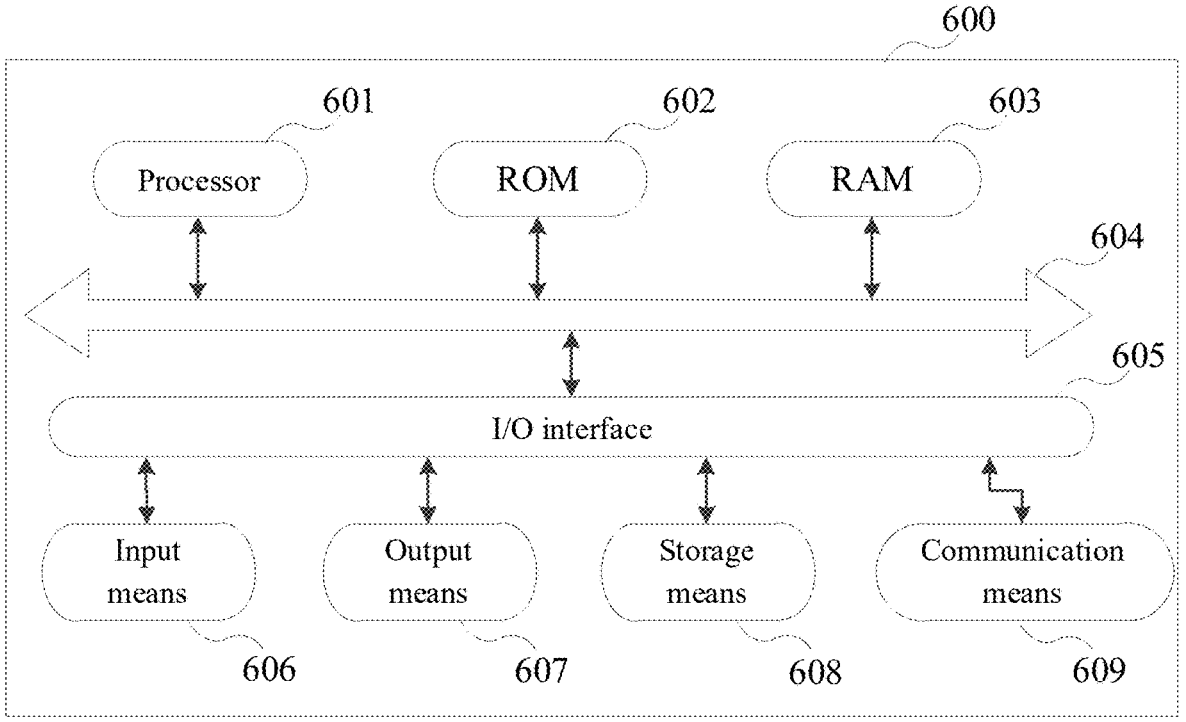
FIG. 6 is a schematic structural diagram of an electronic device provided in an embodiment of the disclosure.

FIG. 6 is a schematic structural diagram of an electronic device provided in an embodiment of the present disclosure, which is used to exemplarily illustrate an electronic device implementing any display control method in the embodiment of the present disclosure, and it should not be construed as a specific limitation on the embodiment of the present disclosure.

As shown in FIG. 6, the electronic device 600 may comprise a processor (e.g., a central processor, a graphic processor, etc.) 601 that may perform various appropriate actions and processes in accordance with a program stored in a Read Only Memory (ROM) 602 or a program loaded from a storage means 608 into a Random Access Memory (RAM) 603. In the RAM 603, various programs and data necessary for operation of the electronic device 600 are also stored. The processor 601, the ROM 602, and the RAM 603 are connected to each other via a bus 604. An input/output (I/O) interface 605 is also connected to the bus 604.

Generally, the following devices may be connected to the I/O interface 605: an input means 606, including, for example, a touch screen, a touch panel, a keyboard, a mouse, a camera, a microphone, an accelerometer, a gyroscope, or the like; an output means 607, including, for example, a Liquid Crystal Display (LCD), a speaker, a vibrator, or the like; a storage means 608, including, for example, a magnetic tape, a hard disk, etc.; and a communication means 609. The communication means 609 may allow wireless or wired communication of the electronic device 600 with other devices to exchange data. Although an electronic device 600 with various means is shown, it shall be appreciated that not all illustrated means are required to be implemented or provided. More or fewer means may be alternatively implemented or provided.

In particular, according to embodiments of the present disclosure, the processes described above with reference to the flow chart may be implemented as computer software programs. For example, an embodiment of the present disclosure includes a computer program product, comprising a computer program carried on a non-transitory computer-readable medium, the computer program containing program code for performing the method illustrated by the flow chart. In such an embodiment, the computer program may be downloaded and installed from a network via the communication means 609, or installed from the storage means 608, or installed from the ROM 602. When the computer program is executed by the processor 601, the functions defined in any display control method provided in the embodiments of the present disclosure may be executed.

It should be noted that the above-described computer-readable medium of the present disclosure may be a computer-readable signal medium or a non-transitory computer-readable storage medium or any combination of the two. A computer-readable storage medium may be, for example, but not limited to, an electronic, magnetic, optical, electro-magnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer-readable storage medium may be any tangible medium that contain, or store a program for use by or in combination with an instruction execution system, apparatus, or device. In the present disclosure, a computer-readable signal medium may include a data signal propagated in a baseband or as part of a carrier, with computer readable program code embodied therein. Such a propagated data signal may take any of a variety of forms, including, but not limited to, an electromagnetic signal, an optical signal, or any suitable combination thereof. A computer-readable signal medium may also be any computer-readable medium other than a computer-readable storage medium, which can communicate, propagate, or transmit a program for use by or in combination with an instruction execution system, apparatus, or device. Program code embodied on a computer-readable medium may be transmitted using any appropriate medium, including but not limited to: electrical wires, optical cables, RF (radio frequency), etc., or any suitable combination of the foregoing.

In some embodiments, the clients and servers may communicate using any currently known or future developed network Protocol, such as HTTP (HyperText Transfer Protocol), and may be communicatively (e.g., via a communications network) interconnected with digital data in any form or medium. Examples of the communication network include a Local Area Network ("LAN"), a Wide Area Network ("WAN"), an internet (e.g., the Internet), and a peer-to-peer network (e.g., the ad hoc peer-to-peer network), as well as any currently known or future developed network.

The above-described computer-readable medium may be embodied in the electronic device; or may be separate and not incorporated into the electronic device.

The computer-readable medium carries one or more programs which, when executed by the electronic device, cause the electronic device to: receive a first gesture input; and in response to the first gesture input, display prompt information, the prompt information being determined according to a position of a peripheral associated with the head-mounted display device.

In an embodiment of the present disclosure, computer program code for carrying out operations of the present disclosure may be written in one or more programming languages or a combination thereof, including but not limited to an object oriented programming language, such as Java, Smalltalk, C++, and conventional procedural programming languages, such as the "C" language or similar programming languages. The program code may be executed entirely on the computer, partly on the computer, as a stand-alone software package, partly on the computer and partly on a remote computer, or entirely on the remote computer or the server. In a circumstance involving a remote computer, the remote computer may be connected to the computer through any type of network, including a Local Area Network (LAN) or a Wide Area Network (WAN); alternatively, the remote computer may be connected to an external computer (for example, through the Internet using an Internet service provider).

The flow charts and block diagrams in the figures illustrate an architecture, functionality, and operation of possible implementations of systems, methods and computer program products according to various embodiments of the present disclosure. In this regard, each block in the flow chart or the block diagram may represent a module, a program segment, or a portion of code, which comprises one or more executable instructions for implementing the specified logical function(s). It should also be noted that, in some alternative implementations, the functions noted in the blocks may occur in an order different from that noted in the figures. For example, two blocks shown in succession may, in fact, be executed substantially concurrently, or the blocks may sometimes be executed in a reverse order, depending upon the functionalities involved. It will also be noted that each block of the block diagrams and/or flow charts, and combinations of blocks in the block diagrams and/or flow charts can be implemented by special purpose hardware-based systems that perform the specified functions or operations, or combinations of special purpose hardware and computer instructions.

The units described in the embodiments of the present disclosure may be implemented by software or hardware, wherein the name of a unit does not constitute a limitation on the unit itself in some cases.

The functions described hereinabove may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), System Ona Chip (SOCs), Complex Programmable Logic Devices (CPLDs), and the like.

In the context of this disclosure, a computer-readable medium may be a tangible medium that can contain, or store a program for use by or in combination with an instruction execution system, apparatus, or device. The computer-readable medium may be a computer-readable signal medium or a computer-readable storage medium. A computer-readable medium may include, but is not limited to, an electronic, magnetic, optical, electromagnetic, infrared, or semiconductor system, apparatus, or device, or any suitable combination of the foregoing. More specific examples of a computer-readable storage medium would include an electrical connection based on one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The foregoing description is only an illustration of preferred embodiments of the disclosure and the technical principles employed. It will be appreciated by those skilled in the art that the scope of disclosure herein is not limited to technical solutions formed by the particular combination of technical features described above, but shall also encompass other technical solutions formed by any combination of the technical features described above or equivalents thereof without departing from the above public concept, such as a technical solution formed by interchanging the above features and the technical features disclosed in the present disclosure (but not limited to) having similar functions.

Further, while various operations are depicted in a particular order, this should not be understood as requiring that such operations be performed in the particular order shown or in sequential order. In certain environments, multitasking and parallel processing may be advantageous. Likewise, while several specific implementation details are included in the above discussion, these should not be construed as limitations on the scope of the disclosure. Certain features that are described in the context of separate embodiments can also be implemented in combination in a single embodiment. Conversely, various features that are described in the context of a single embodiment can also be implemented in multiple embodiments separately or in any suitable sub-combinations.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

What is claimed is:

1. A display control method, being applied to a head-mounted display device, the method comprising:

determining that a peripheral associated with the head-mounted display device is in a state of not being held;

in response to receiving a control triggering gesture, triggering display of a control on a virtual hand model;

receiving a first gesture input to the control on the virtual hand model; and in response to determining that an input position corresponding to the first gesture input is matched with a position of the control on the virtual hand model, triggering display of prompt information, the prompt information being determined according to a position of the peripheral.

2. The method of claim 1, wherein the prompt information is a target object, the target object being used to indicate the peripheral;

said displaying the prompt information in response to the first gesture input comprises:

displaying the target object at a target position in response to the first gesture input, wherein the target position is a position corresponding to the peripheral.

3. The method of claim 2, wherein said displaying the target object at the target position comprises:

displaying the target object at the target position based on a see-through function of the head-mounted display device.

4. The method of claim 2, wherein the target object is a virtual model corresponding to the peripheral; and said displaying the target object at the target position comprises:

displaying the virtual model at the target position.

5. The method of claim 4, wherein the virtual model is either preset or generated from a real pose of the peripheral.

6. The method of claim 1, wherein the first gesture input is a gesture input to the control.

7. The method of claim 6, wherein after displaying the prompt information, the method further comprises:

starting a peripheral tracking interaction mode under a condition that a sensor of the peripheral detects that the peripheral is held or a gesture input to the control is detected.

8. The method of claim 1, wherein the method further comprises:

starting a gesture recognition interaction mode under a condition that it is detected the peripheral is not being held and a hand image is acquired by a camera of the head-mounted display device.

9. The method of claim 1, wherein said display of displaying a control on a virtual hand model comprises:

displaying the control at a wrist position of the virtual hand model.

10. An electronic device, comprising: a memory for storing a computer program; and a processor, when the computer program is invoked, the processor is configured to perform the following steps:

determining that a peripheral associated with the head-mounted display device is in a state of not being held;

in response to receiving a control triggering gesture, triggering display of a control on a virtual hand model;

receiving a first gesture input to the control on the virtual hand model; and in response to determining that an input position corresponding to the first gesture input is matched with a position of the control on the virtual hand model, triggering display of prompt information, the prompt information being determined according to a position of the peripheral.

11. The electronic device of claim 10, wherein display of a control on a virtual hand model comprises:

displaying the control at a wrist position of the virtual hand model.

12. A non-transitory computer-readable storage medium, having a computer program stored thereon, the computer program, when being executed by a processor, performs the following steps:

determining that a peripheral associated with the head-mounted display device is in a state of not being held;

in response to receiving a control triggering gesture, triggering display of displaying a control;

receiving a first gesture input to the control on the virtual hand model; and in response to determining that an input position corresponding to the first gesture input is matched with a position of the control on the virtual hand model, triggering display of prompt information, the prompt information being determined according to a position of the peripheral.

13. The electronic device of claim 12, wherein said display of a control on a virtual hand model comprises:

displaying the control at a wrist position of the virtual hand model.

* * * * *